Oct. 22, 1957  W. E. McFARLAND  2,810,840
CURRENT-ACTUATED A. C. RELAY SENSING SYSTEM AND ENGINE-GENERATOR
IDLING DEVICE EMPLOYING SAME
Filed Dec. 26, 1956  4 Sheets-Sheet 1

WILLIAM E. McFARLAND
INVENTOR.

WILLIAM E. McFARLAND
INVENTOR.

FIG. 13

WILLIAM E. McFARLAND
INVENTOR.

BY [signature] Attorney

Oct. 22, 1957 W. E. McFARLAND 2,810,840
CURRENT-ACTUATED A. C. RELAY SENSING SYSTEM AND ENGINE-GENERATOR
IDLING DEVICE EMPLOYING SAME
Filed Dec. 26, 1956 4 Sheets-Sheet 4

WILLIAM E. McFARLAND
INVENTOR.

United States Patent Office 2,810,840
Patented Oct. 22, 1957

2,810,840

CURRENT-ACTUATED A.-C. RELAY SENSING SYSTEM AND ENGINE-GENERATOR IDLING DEVICE EMPLOYING SAME

William E. McFarland, Nutley, N. J.

Application December 26, 1956, Serial No. 630,561

13 Claims. (Cl. 290—40)

This invention relates to an improved relay sensing system capable of responding to current flow in ordinary A.-C. power circuits (such as 60 cycle circuits) where there is a requirement for pull-in or hold-in response of the relay at a predetermined small current flow bearing a fractional relationship to the rated flow in said circuit.

Using the present prior art teaching, the simplest arrangement for accomplishing this result involves merely an A.-C. type of relay having its coil connected directly in series with the power circuit. Unfortunately, these relays afford only a small amount of switching capacity in relation to the power lost through the relay coil. Besides, these relays must be large and expensively constructed where any considerable ratio of sensitivity range is needed.

In addition to the aforesaid, sensing systems comprised of a current transformer and an indirectly energized relay have been used. By employing special expedients, such as a very high reactance type of transformer, it is possible to utilize smaller and more conventional relays than in the above cases where the relay is directly energized. But this latter system, ordinarily, has the same basic objections of poor functional efficiency and overheating of the transformer and the relay.

The present system utilizes a special type of current transformer, actually a very small one. And, for typical average applications, the primary winding may have a design voltage as low as one volt. The system requires only an inexpensive conventional relay whose normal working range is multiplied many times through the effect of the novel system employed. This system includes the use of certain critical design limitations and relationships which make it possible to employ rectifier cells (such as selenium, germanium, of other contact-type rectifiers) in the relay energization circuit. When all of the elements of the invention are thus included, an extremely strong switching response is obtained with relation to the sensitivity range to be met, while still enabling the rectifier cells to withstand the unnatural conditions of operation involved in this current actuated system. In the system of the present invention, the current flow in the transformer secondary circuit is levelled off in a sufficiently abrupt and complete manner so that all of the elements in this circuit operate suitably within their dissipation capacity. These elements of the said secondary circuit comprise the small transformer secondary winding, the small rectifier cells, and the small relay.

It has long been recognized in the art that rectifiers of the contact type are unsuitable for current actuated systems where current input is not uniform, because, due to their nature, they burn out easily under such conditions. It has been found in the operation of the present invention that such rectifiers may be employed provided that the transformer is small and is operated within a core magnetization range, the minimum limit of which is near the point of core saturation, and provided also that other limitations, which hereinafter shall be set forth, are included. The aforesaid conditions will thus assure a significant volt-ampere input to the sensing system, and the inclusion of the rectifier cells will have the particular advantage of assuring a very high power factor. Thus, the greatest possible switching power is obtained with respect to small circuit current flow, particularly since it has been found that good rectifier efficiency is possible. In view of the high core saturation, the transformer current output levels off abruptly so that this output is still quite small (just a little more than the minimum energization current requirement of the relay). This is true even when there has been a sufficient increase in load circuit current flow to drive the output voltage upwardly to the point of any significantly normal degree of reverse current flow (or leakage) through the rectifier cells. It has been found, according to the present invention, that if rectifier leakage is reasonably deferred, that it is, if it is prevented from occurring until the transformer core is operating somewhat beyond saturation, that this leakage will not assume serious proportions, and the cumulative effect of added load in the load circuit becomes increasingly less, resulting in almost complete leveling off of leakage current.

A most difficult application for a current-actuated sensing system is that of controlling an electromagnetic actuator, such as an idling device, through which a throttle-closing effect can be applied to slow down the engine of an engine-generator set when all load is turned off. Such a sensing system must be responsive to the first small flow of current in the associated load circuit, in order to provide the switching response that will relieve the forced-idle condition. There has been no general use of idling devices for small A. C. engine-generator sets, in spite of a great need. Load demand ordinarily is intermittent in such cases, yet, without an idling device, the engine operates at continuous high speed. Relays or sensing systems heretofore have been inadequate for the purpose. The novel system disclosed herein provides the strong switching response that is needed, and is operable over the necessarily wide range of current flow (through the range of frequencies involved) to successfully serve as a sensing system in an idling device.

Furthermore, the system herein described is extremely versatile in application. Thus, where the load current range requirement is not too great the relay proper of the system may be a heavy duty switching relay. Also, the system is applicable to some situations where the range requirement is small, say only 6 to 1. At the other extreme, it is applicable (with the use of only simple components) to handle a range requirement of several hundred to 1, which is a range far greater than has ever been attempted heretofore. In size of elements, uniform switching response, and freedom from armature chattering and sticking, the system is closely comparable to a simple voltage-actuated relay system of the kind employing a transformer and rectifier merely to improve relay operational quality.

The invention will be more readily understood by reference to the drawing in which Figure 9 illustrates the assembled core only of still another type of transformer which may be used in the practice of the invention, and which is inexpensively made, while Figure 9a is a sectional view of the core of the transformer shown in Figures 9 and 10. Figure 11 depicts a relatively sensitive type of conventional relay which may be used as an element of the sensing system of the present invention, while Figure 13 presents a diagram illustrating an engine-generator set including an idling device in which the present invention is employed as a sensing system to maintain the electromagnetic actuator energized during the on-load period, while

Figure 1:
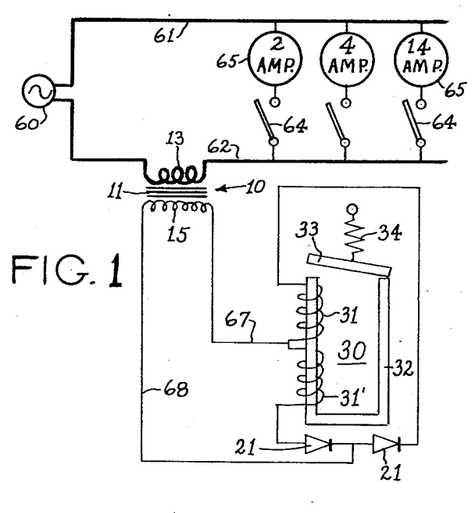
Figure 1 depicts one embodiment of a schematic circuit diagram illustrating the elements employed and utilizing one type of rectification circuit.

Referring again to the drawings, Figure 1 illustrates one circuit arrangement which may be employed for practicing the present invention. An A.-C. power source, say one of 60 cycles, is indicated by numeral 60. Lines 61 and 62 conduct the current to loads 65 of which three are shown to be 2, 4 and 14 ampere loads, respectively, indicating that response of the sensing system is not required below a value of 2 amperes of load circuit current, and indicates that maximum load is at least 20 amperes.

Current transformer 10 (Fig. 1) has a high permeability core 11 and a primary winding 13 in the load circuit. A relay 30 is shown diagrammatically, with switching contacts omitted. Operating coils 31 and 31' are disposed on one leg of core 32 of the relay and spring 34 holds armature 33 in the dropped-out position. Coils 31 and 31' have one common connection to wire 67 and, in a sense, represent one longer coil having a center-tap. Rectifier cells 21 are connected in series with each other and are connected across the remaining terminals of coils 31 and 31'. Wires 67 and 68 join secondary winding 15 with coils 31 and 31' through rectifiers 21 in a manner whereby polarities are selected so as to energize coils 31 on alternate half-cycles in an approximation of full-wave energization on relay 30. Relays having two alternately energized coils have been used in the prior art in voltage-actuated relay systems, as an expedient in reducing the number of rectifier cells, thus perhaps avoiding the alternative of a step-down transformer. However, in the present invention, the expedient of alternately-energized coils is not employed for the purpose of reducing the number of rectifier cells, as will become apparent from the subsequent description.

To one familiar with the prior art, a first inspection of any of the circuits depicted in Figures 1 to 4 would indicate that rectifier cells 21 should have no proper place therein. Even if relay 30 were part of an overload protective system, it would be improper to include the rectifiers, because such a system would operate efficiently without benefit of rectified current for its relay, and there would be the serious fault that any rectifier failure would render the protective system inoperable.

Also, under conventional conditions, employing non-saturated transformer cores, the rectifiers would be improperly included, assuming the circuit of Figure 1 were to be used for sensing the minimum circuit flow in the load circuit.

It has been found, however, that the inclusion of the rectifiers in the Figure 1 circuit, in combination with certain design limitations and relationships, makes it practical to operate core 11 within a magnetization range, the minimum limit of which is near the point of core saturation, achievable at small circuit current flow. With the core operating always at or beyond saturation, the volt-ampere input capacity of the transformer may be very small according to usual standards, and the output capacity (i. e., the wattage capacity of the secondary winding) may be very much smaller than the input capacity. These factors in turn make it suitably economical and practical to construct a transformer capable of being operated always at or beyond saturation. Provided only that the transformer be of adequate quality for the particular application, it is possible, with simple, low cost rectifiers, to obtain an extreme extension of the natural sensitivity range of ordinary simple relays, while at the same time eliminating almost all the disadvantages that have attended current-actuated sensing systems heretofore.

The use of the circuit of Figure 1 as a sensitive sensing system is more readily explained by making the assumptions that core 11 is of nearly ideally permeable material (one having no core losses of consequence at any operating condition), and that rectifier cells 21 are functionally nearly ideal (having low forward resistance and relatively unlimited reverse current resistance). A third assumption is that relay 30 may be energized suitably by rectified current of wave form similar to the current wave of the load circuit and barely to the extent of pull-in with, say, 1.0 volt-ampere. It is known that if a relay can be operated by one watt of battery current, that it will usually be operable by one volt-ampere of rectified current of reasonably normal wave form. Also, an ordinary relay coil will withstand at least twice the rectified pull-in current.

Another assumption is that the specification's strictest requirement is that relay 30 be adequately pulled in by not over 2 amperes of constant load current, which, for this example, will be termed the "predetermined small flow." This would include the assumption that there is no still more difficult requirement involved in the particular application (such as a requirement for hold-in with 0.5 ampere of circuit current flow, in which case the "predetermined small flow" would be 0.5 ampere). It will be observed that 2 amperes flow is not necessarily the only flow that could be termed a "small flow" or "still small flow," thus 4 amperes flow would still be a small flow in a 20 ampere load circuit. Hereafter, and in the claims, the terms "small flow" or "still small flow" will be used, but will not necessarily indicate the "predetermined small flow." The discussion herein will be largely confined to the pull-in point of the relay for the reason that the hold-in point usually will be adequate if pull-in point is adequate.

Considering the assumptions, e. g., that relative to the ideal core quality, the ideal rectifier characteristics, the 1 volt-ampere requirement of the relay, and the 2 ampere flow as the "predetermined small flow" of circuit current, it would be possible in accordance with this invention to establish the design voltage of primary winding 13 even below 1 volt and yet obtain pull-in of relay 30 from benefit of 2 amperes flow, by basing the design voltage on working core 11 to saturation. For the purpose of this invention, the core will have to be considered to be worked to saturation when it is worked at the knee of the saturation curve, and the most efficient core material is that in which the knee is very high in the curve.

Making the still further assumption that coils 31 and 31' are impedance-matched to secondary winding 15 for optimum energy transfer for the 2 ampere flow, it will be evident that relay 30 will be pulled-in with some reserve of force, and also that the optimum impedance match will be one necessitating core 11 to be worked about to the saturation level, i. e., at about the knee of the curve. Also it probably would be found the relay 30 could be pulled-in through benefit of only, say, 1.5 amperes circuit flow, and this without changing the impedance match, resulting in core 11 being worked less closely to saturation, i. e., just below the knee of the curve. Also, either 1.5 amperes or 2.0 amperes could be regarded as the "predetermined small flow" for the particular application. In other words, the term "predetermined small flow" includes any flow below the specification's strictest requirement if pull-in of the relay occurs therewith.

It is possible to choose electives, within limits, as to the exact impedance match desired. The match may be that suggested above, i. e., for optimum pull-in force at 2 amperes flow and, in this case, pull-in force will be just moderately stronger with respect to initial flow larger than 2 amperes. The impedance match may be changed in the direction of using higher resistance coils 31 and 31' up to the point where pull-in is just barely obtained at 2 amperes flow in which case relay 30 will tend to be more or less just barely pulled-in with larger flow also. This particular impedance match results in working core 11 beyond saturation even with only a 2 ampere flow. Thus the output pulses from transformer 10 have shortened even with only the 2 ampere flow. This is inefficient in a sense, and, for the purpose of discussion and the claims, the core will be assumed to be worked only "about" to saturation even though it may and will happen in individual cases that the conditions herein are applied in the extreme manner that the transformer core is worked beyond saturation even as the minimum limit of core magnetization.

The match may be changed in the direction of using lower resistance coils 31 and 31' up to the point where pull-in is just barely obtained at 2 amperes load flow. in which case there will be a very good reserve of pull-in force when initial flow is appreciably above 2 amperes. This latter impedance match may be found impractical, in that one or more elements of the electromagnetic relay circuit may heat up beyond the limits of dissipation capacity, these elements being winding 15, coils 31 and 31' and rectifier cells 21.

From the above it is clear that the transformer core is to be operated at least about to saturation at small circuit current flow, and the transformer must be designed to have a useful output capacity adequate for the energization requirement of the relay at the predetermined small circuit current flow, and that the impedance match must be such as to effect operative energization of the relay at least at occurrence of the predetermined small load circuit current flow, which is suggested as being 2 amperes in this example. The impedance match must also be within such limits that the relay is energized to less than the working capacity of its coils at such point of still small load circuit current flow when the transformer core has only become operated only to saturation but not beyond. Core 11 is not necessarily operated to full saturation at the predetermined small circuit current flow, and, in applications where sensitive relays are used, it may be found possible to establish the predetermined small circuit current flow at a point where the core is operated even well below saturation. But the core will definitely be operated at least about to saturation when circuit current flow is still small compared with large circuit current flow. As long as the relay coils have some reasonable reserve dissipation capacity for the condition of operating the core about to saturation, then the dissipation capacity of the coils will not be exceeded. The relay coils have reactance as well as resistance, and this, coupled with the shortening of the transformer pulses when load circuit current increases, tends to assure an extremely abrupt levelling off of current flow in the relay energization circuit. The transformer cannot efficiently convert its volt-ampere input into output in terms of watts because the impedance match is based on a small load current. Other than the effect of rectifier leakage, increases in circuit current flow have extremely little effect on the wattage output of the transformer. This avoids necessity for unduly large and inefficient structure for coils 31 and 31' merely for heat dissipation purposes, and more important, avoids the need for large capacity in secondary winding 15. This capacity would be particularly difficult to provide as there tends to be very little efficiently usable winding space in a transformer constructed for operating its core far beyond saturation.

The explanation, so far, is based on the assumption of nearly ideal transformer core material and rectifier cells, and of these two the core material can be practically ideal in an application involving only moderate range, while commercial rectifier cells, as is well known, have sharp limitations. Fortunately, the lack of ideal rectifiers does not seriously detract from the relatively unlimited extension of range that is possible.

Good rectifier efficiency must be obtained at the minimum condition which was suggested as being the 2 ampere flow. It will be seen that if the design voltage of secondary winding 15 were entirely too low with respect to the normal rated working voltage of the particular commercial rectifiers employed, that several difficulties would arise. First, to offset rectifier losses, it would be necessary to increase considerably the design voltage of primary winding 13. This is basically adverse and, in addition, it becomes difficult to construct the transformer for saturation operation if the design voltage is not kept low. Second, the rectifier efficiency would increase with respect to circuit flow above 2 amperes, due to the inherent characteristic of rectifiers to offer less forward resistance when higher voltage is applied. The increase in efficiency would make for an excessive increase in current flow in the relay energization circuit, with consequent heating problems. It is therefore necessary to have good rectifier efficiency by the time that the transformer core is operated just to saturation, i. e., the time when the relay coils still have a reserve capacity for heat dissipation. For the purposes herein, good rectification efficiency is that not only by which excessive waste of relay energization energy is avoided, but by which rectifier efficiency does not improve so greatly as to introduce heat dissipation problems in the elements of the secondary circuit. Good rectification efficiency for the purposes herein however may be less than good rectification efficiency in conventional rectifier applications where 85% and higher efficiency is common. In general, good rectification efficiency for the present application would be an efficiency above 50%, and by this it is meant that at the condition of just operating the transformer core to saturation, the rectifier cells would be absorbing less energy than coils 31 and 31'. Fortunately, good rectification efficiency is obtainable under the conditions encountered. The design voltage of secondary winding 15 can be at least several times the voltage drop that is taken by the rectifiers.

While rectifier efficiency must be good when the transformer core is worked at around saturation, it is permissible to accept poor rectifier efficiency in certain instances. In extending the range of the present system to the utmost, using sensitive or wide-ratio types of relays, the relay is adjusted for its most sensitive operation, and pull-in can be obtained with the core operating only at a fraction of saturation and with low rectifier efficiency. It will be recognized that this extra flexibility is something that is obtainable only from the use of sensitive relays and is a matter aside from the extension of relay sensitivity range by use of the conditions employed herein.

As just explained, a purpose of good rectification efficiency is to avoid heating effects which would occur if rectifications were not good when the transformer core is operated just to saturation. However, serious heating difficulties will occur if rectifier efficiency is made too good, that is, if the design voltage of winding 15 is too high. Considering the limitations of commercial rectifiers, it is not possible to obtain good rectifier efficiency and still avoid rectifier leakage of some significance, except in applications where the load current range is quite limited in relation to the switching power that is required. The design voltage of secondary winding 15 therefore must be within such limits that significantly large rectifier leakage current is deferred until transformer core 11 is operated adequately beyond saturation. Large load circuit current necessarily will result in higher voltage being induced in secondary winding 15, and extent of this voltage rise will be checked by rectifier leakage. Provided that the design voltage of winding 15 is reasonably low with respect to the rated working voltage of the rectifiers, the rectifier leakage will be suitably small in terms of watts and this is especially possible because the input capacity of transformer 10 is exceedingly small for a current-actuated system. It has been found that ordinary commercial rectifier cells, such as those of selenium, have enough working range to permit the design voltage of secondary winding 15 to be high enough to obtain the necessary good efficiency and at the same time low enough to defer rectifier leakage to the point where the consequences of leakages will be suitably a few watts and especially will not overload the secondary winding. The effect of rectifier leakage tends partially to offset the abrupt transformer output leveling off that occurs when the transformer is operated just a little beyond saturation, but as load current is increased further and further, there is a final leveling off where still larger load circuit current does not produce appreciably more rectifier leakage.

The applications of this invention are not dependent on the particular rectification circuit that is employed, but the rectification circuit of Figure 1 frequently is the most suitable. Aside from reverse-direction current flow through a rectifier, all the current from secondary winding 15 during one half-cycle will pass through coil 31 and one rectifier 21, and on the next half cycle will pass through coil 31' and the other rectifier cell 21. In Figure 1 the two coils are shown in a tandem arrangement. Coil 31 being nearer the air gap, will have good efficiency toward pulling in armature 33. Aside from said distortion effect due to rectifier leakage, the two coils will have equal effect in providing good hold-in of the armature. It is not essential that coils 31 and 31' have exactly the same size and number of turns, and in special cases it is permissible to make one coil a little different than the other.

The use of two separate coils is inefficient in that a single larger coil has more power. This inefficiency is offset to some degree by higher rectification efficiency. The design voltage of windings 15 may be as high for Figure 1 as for Figure 4, yet the relay energization current passes through only one cell in the Figure 1 arrangement.

A particular advantage of the Figure 1 circuit is that smaller rectifier cells can be used than in the case of using conventional rectifier circuits. In the Figure 1 circuit, there is less rectifier heating, but more heating of the relay coils than in conventional circuits but, since conventional relays have a fairly good reserve of coil capacity, it is beneficial to utilize this capacity in order to obtain cooler rectifier operation and smaller rectifier cells. It will be obvious that when load circuit current is, say, several times that necessary to effect saturation operation of core 11, that there wil be some appreciable rectifier leakage. Thus, at an instant when coil 31' is being normally energized, there will be a reverse-direction current flowing through coil 31 and its rectifier 21. This reverse direction current weakens the armature pull, but at the same time it also reduces the reactance value of coil 31 so that the normal energization current is increased. Considering the resistance and impedance effects of coils 31 and 31', current flow in the relay circuit cannot assume very large proportions and, since only the smaller fraction flows through a rectifier in reverse direction, relatively little rectifier heat is produced.

The circuit of Figure 1 is quite suitable where ambient temperatures are high. A realy with good coil dissipation capacity can be used, to assure long coil life, and the circuit of Figure 1 helps to assure sufficiently cool operation of the rectifier cells which are subject to damage if operated beyond rather critical temperatures. Another advantage of the circuit of Figure 1 is that failure of a rectifier, such as a shorted rectifier, does not result in the more serious damage of burning out the transformer, since the relay coils have adequate resistance value to prevent the short-circuit effect from reaching the transformer. Overload or momentary short circuit conditions in the load circuit also will have little effect in elevating the temperature of the elements of the relay energization circuit of Figure 1.

It will be apparent that the force of the armature action during pull-in of relay 30 will be quite uniform and largely independent of the size of load circuit flow effecting the pull-in. Thus, pull-in obviously will be suitably gentle at the minimum circuit flow for pull-in, and it will still be gentle at a moderately greater flow since coils 31 and 31' will gain reactance as the transformer pulses grow shorter. At the condition of pulling-in the relay by effect of very large circuit current flow, the action still will be gentle, as the two coils partly oppose each other. Furthermore, there will be little or no tendency for armature 33 to stick to the core, a common difficulty when sensitive relay response is desired. This is because core 32 of the relay is never saturated to the extreme, and therefore, there is no large residual magnetism in the core at any time. It is impossible for core 32 to be highly saturated by effect of heavy load current because of some opposition between coils 31 and 31'.

In the preceding explanation of Figure 1, it was assumed that relay 30 was a rather heavy duty relay requiring 1 volt-ampere of energization, with pull-in desired at least by 2 amperes circuit flow, and maximum circuit flow to be 20 or 30 amperes or even more according to what current winding 13 could carry safely. If relay 30 were to be of a more sensitive type, such as one requiring 0.05 to 0.1 volt-ampere, the range of response can be correspondingly greater and still without necessity for more than 1 volt as the design voltage of winding 13. Sensitive relays can be pulled-in on a very small fraction of an ampere circuit flow. The quality of the transformer core material becomes more critical as the core will have to be operated to saturation through benefit of only the small fraction of an ampere, and while the transformer is providing useful energization to the relay.

Figure 2:
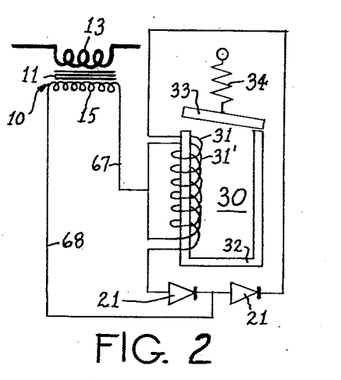
Figure 2 shows a similar diagram, omitting details of the load circuit, and illustrating a different arrangement of the relay operating coils.

Referring now to Figure 2, the arrangement is the same except that coils 31 and 31' are concentrically arranged. Each coil may have the same turns and the same resistance if desired, as for example, by winding two wires on the same form or bobbin simultaneously. The coil arrangement of Figure 2 results in a more uniform hold-in ability of the relay as compared with the coil arrangement of Figure 1, because the two coils are equally near the air gap.

Figure 3:
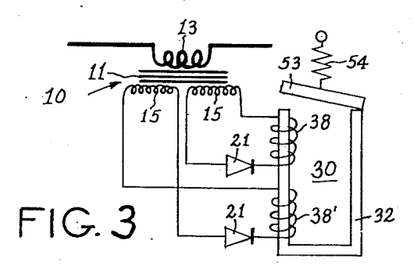
Figure 3 presents a diagram similar to those in Figures 1 and 2, and illustrates a further modification of the rectification circuit.

Figure 3 illustrates a further variation of the Figure 1 circuit. The two secondary windings 15 are provided, and coils 38 and 38' are not connected in a center-tap arrangement. Thus, the coil circuits are completely isolated, which may be desirable in some complex control systems. The general operation and efficiency of the Figure 3 circuit is about the same as the Figure 1 circuit.

Figure 4:
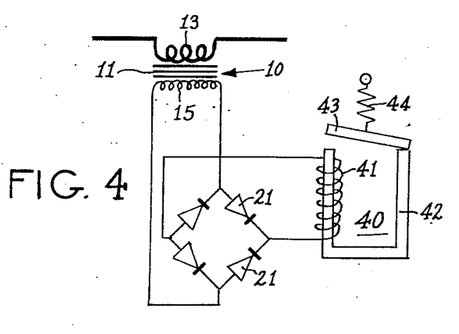
Figure 4 illustrates a diagram similar to that in Figure 1, but utilizing another type of rectification circuit.

Figure 4 is similar to Figure 1, except that details of the load circuit are omitted and, in addition, a conventional full-wave rectification circuit is shown employed. The bridge circuit is equal to any other conventional circuit in efficiency and thus is the only one illustrated. In Figure 4, the relay is indicated by numeral 40, and the single relay coil by 41. Core 42 may be permissibly shorter than core 32 of Figure 1 since a single coil is more efficient than alternately energized coils. Armature 43 is held unattracted by spring 44.

As in the Figure 1 circuit, the transformer must be operating at about saturation at the minimum limit of core magnetization. The impedance match between coil 41 and winding 15 must be within proper limits so that coil 41 has some reserve capacity when operating core 11 just to saturation, and there is more latitude than in Figure 1 because rectifier leakage current does not flow through the coil in Figure 4. The design voltage of winding 15 must be selected for good rectifier efficiency, as previously defined, and also, within limits to prevent excessive heating effects arising from rectifier reverse current flow, and in Figure 4 the reverse current tends only to heat winding 15 and the rectifier cells themselves. The tendency therefore is for the rectifier cells to be operating near their safe temperature limit when full load is in effect. The cell temperature can be kept within safe limits by utilizing somewhat oversize cells, i. e., several times as large as is strictly necessary with respect to the amount of forward current passed. The oversize cells have a little lower forward resistance than smaller cells, and thus help a little in obtaining good efficiency. At the same time, the reverse resistance is relatively similar whether the cells are large or small, and the oversize cells operate cooler, even though they do draw somewhat larger current and thus place more of a burden on secondary winding 15.

Figure 5:
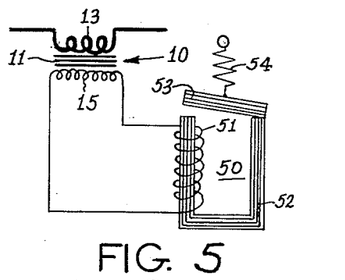
Figure 5 shows a diagram illustrating a conventional arrangement of a current transformer and an energized relay, without benefit of rectification.

Figure 5 illustrates the condition of a present day sensing system in which a current transformer is employed, but rectification is omitted. Relay 50 has a single operating coil 51, a laminated core 52, armature 53 and armature spring 54. Assuming relay 40 is to have switching power equivalent to relay 30 of Figure 1, primary winding 13 would have to be designed to have a much higher design voltage than winding 13 of Figure 1 for obtaining pull-in at a given predetermined point of small load circuit current flow. The components of Figure 5 will overheat seriously if a wide sensitivity is attempted.

Figure 6:
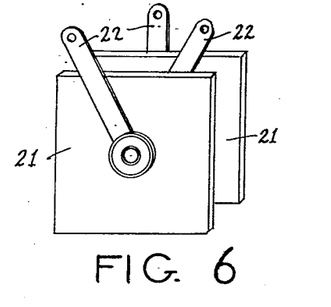
Figure 6 is a perspective view of a selenium rectifier assembly, having connection terminals suited for use in the circuit shown in Figure 1.

Of the rectifier cells available at the present time, the common selenium cell is inexpensive and fully suitable. A selenium rectifier assembly is illustrated by Figure 6. Two cells 21 are required for the circuit of Figure 1. One of the three terminals 22 is in contact with the negative side of one cell and with the positive side of the other. The typical selenium cell of today has a nominal rating of about 20 volts R. M. S., although in resistive and inductive circuits the cells are permissibly operated above 20 volts R. M. S. even in conventional applications, since the maximum inverse peak voltage usually is stated as being about 63 volts. The reverse resistance value of the cell decreases very rapidly as the applied reverse voltage approaches 63 volts, which, in the case of the circuit of Figure 4, will prevent peak voltage of secondary winding 15 from reaching 63 volts, whereas peak voltage of winding 15 in the case of Figure 1 may rise above 63 volts, according to design details. Under average R. M. S. current conditions and resistive loads, the forward drop through selenium rectifiers is a little less than one volt per cell, and thus is ordinarily below one volt under the condition when transformer core 11 is operated just to saturation. If the design voltage of secondary winding 15, therefore, is 6 volts, rectifier voltage drop will be, say, only 2 volts (in Figure 4), and good rectifier efficiency within the limits required for the system herein, will be obtained. Under this condition, load current flow will have to increase several times over before peak voltage is approaching the 63 volts for which the cells are rated, and by this time, transformer output will have levelled off to an extent so that not many watts of heating effect will occur, either in the rectifier cells or in any of the other elements, and in the case of Figure 1 the elements affected by rectifier leakage include the relay coils 31 and 31'.

Figure 7:
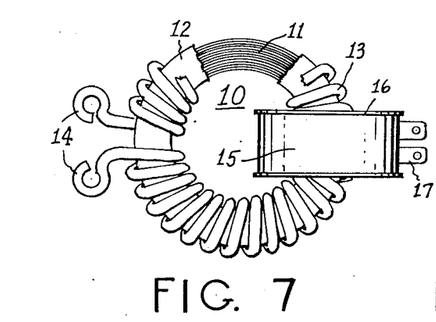
Figure 7 illustrates a toroidal current transformer having a tape-wound core and especially suited for use in the circuits of Figures 1 to 4.

This invention requires that core 11 of transformer 10 be operated within a core magnetization range, the minimum limit of which is near the point of core saturation which in turn provides the possibility of obtaining wide range operation from rectifier cells and also insures the necessary leveled-off transformer output. Deviation from this minimum saturation limit of core operation can be tolerated only by resorting to relays having an inherently large range of their own and, since these often will not be permissible or available it frequently will be necessary to avoid appreciable compromise in the matter of constructing the transformer core for insuring the saturated condition. Figure 7 illustrates a form of transformer 10, which, as constructed with the best available core material, meets the requirements of the system described herein.

Transformer 10 has a toroidal gapless core 11 which is illustrated as being a continuous tape-wound core. Core 11 is covered by insulation 12 which may be in the form of a plastic case or box. Primary winding 13, of coarse enough wire to carry the load circuit current, is wound around core 11, and has terminals 14. Secondary winding 15 having terminals 17 is shown supported on an insulated bobbin 16. Bobbin 16, prior to assembly, is in the form of a split bobbin, the portions of which are put into position to encircle core 11, then joined into a whole bobbin, and the winding 15 is placed by applying a frictional drive to the rims of bobbin 16. This arrangement of a bobbin for carrying secondary winding 15 not only enables quick manufacture, but avoids spreading the secondary winding over any considerable area of the primary winding and thus also avoids insulation layers between the windings, and permits the best cooling of primary 13 which is important as it is desirable to use the smallest possible wire for primary 13 to permit a sufficient number of turns per unit core length to more easily enable core saturation. Further details on its construction are given in copending application Serial No. 620,742, filed on November 6, 1956, by William E. McFarland.

The mass of secondary winding 15 can be quite small provided that only a small relay is to be energized, and the mass may be greater proportionately than illustrated in Figure 7 where a relatively heavy duty relay is to be energized.

The concentration of the secondary winding in a small portion of the core length tends to make for a moderately high reactance effect between the windings of the transformer. This is not objectionable provided that the effect is not sufficient to impair seriously the energy transfer under the condition of minimum load circuit flow. At the same time, a high reactance effect is not a necessity in the present system.

The toroidal core permits the greatest use of the effective length of the core for the primary winding, and since no core material is wasted in this construction, it is more economically possible to employ the best grades of high permeability material.

It is necessary that the core material be adequate in permeability qualities, to obtain a finished transformer having the required performance for the individual application. Within limits, the less superior grades of core material can be made to suffice by making the core as slender as possible, and using more primary turns per unit length of core. This practice, however, cannot be carried too far as multiple turns of primary winding would be involved, and the turns of winding become so much longer after the first or second layer of winding about a very small core, that the purpose is defeated.

Among the most suitable high permeability materials for core 11 as a tape wound core are the nickel-iron alloys containing about 50% nickel.

Figure 15:
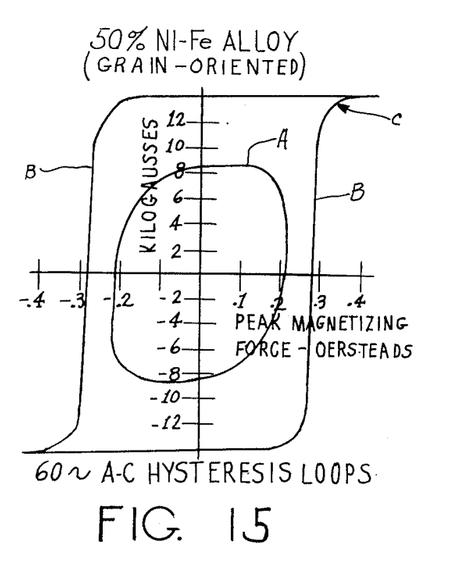
Figure 15 shows a chart illustrating hysteresis loops of a grain-oriented nickel-iron alloy particularly suited as the core material for the transformers employed in the practice of this invention. Similar numerals refer to similar parts in the various figures.

As is apparent from Figure 15, these alloys saturate at around 14,000 gausses, and the best of them saturate quite sharply, i. e., they are practically completely saturated at the knee (C) of the saturation curve (B). Curve A illustrates the hysteresis loop obtained by operating this material at about 60% of saturation. High permeability grades of grain-oriented silicon iron are commercially available in thin tape form and in other forms and, above the knee of the saturation curve, their further saturation is very gradual. It will be obvious that any secondary saturation is a factor which adversely increases the effective output of the transformer under the condition of large circuit flow, and therefore, core materials should be avoided in which secondary saturation would be too large a factor.

With respect to the conditions suggested for explanation of Figure 1, the transformer core 11 may be say of 50% nickel-iron alloy, having a sectional area of say 0.12 sq. in., using 30 turns of primary winding to provide a design voltage of approximately 1 volt for the primary winding, as suggested. As wound with, say #12 solid wire, core 11 need not be over 2″ in outside diameter. With such a transformer, the range of the system may be quite wide, the transformer operated practically at saturation as the minimum condition, and very little of the input energy to the transformer will be diverted by core losses. The design voltage of the secondary winding will be a compromise between that for good rectifier efficiency and that by which rectifier leakage is moderate enough to permit suitably small elements in the secondary circuit.

Figures 8, 8A:
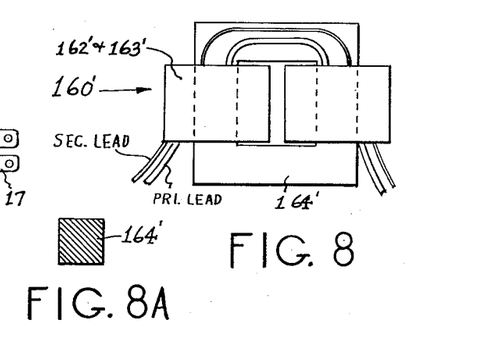
Figure 8 depicts a current transformer having a core constructed of conventional stamped laminations, which may be employed in a limited way in the practice of the invention.
Figure 8a is a sectional view of the core of the transformer shown in Figure 8.

Figures 8 and 8A represent another design of transformer 160′ which is made up along conventional lines and may be used as an element of the system of the present invention. This transformer has a core 164′ which may be made up of the usual stamped laminations (such as L type laminations) of such material as a high permeability nickel-iron alloy. The windings are carried on two legs of core 64′ with a portion of primary 162′ and secondary 163′ on each leg. The core area is indicated by Figure 8A and for average uses for the present invention, the core area may be, say 0.16 sq. in., which, in combination with 24 turns of primary winding, would provide a desirable low design voltage of approximately 1 volt for the primary winding.

Figures 9, 9A:
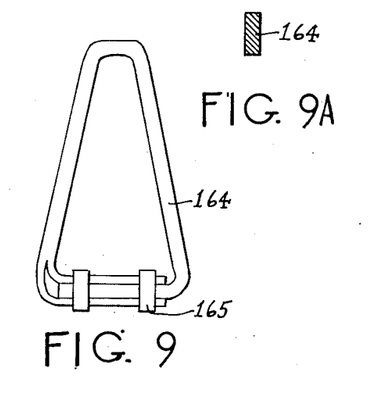
Figure 10:
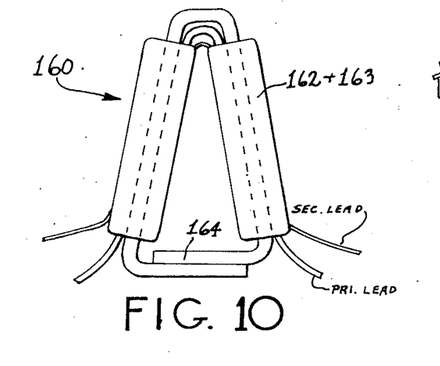
Figure 10 illustrates this type of transformer in complete form.

Figures 9, 9A and 10 illustrate still another design of transformer 160 suited for the purposes of the present invention. This is a transformer which may be conveniently constructed from plain strips of thin laminations which are formed into a straight or V-shaped bundle, the pre-assembled windings being slipped into position on the bundle, and the transformer completed by bending the bundle or strips so that the ends of the bundle can be interleaved or merely overlapped. Figure 9 illustrates the appearance of such a core 164 as it would appear as a completed transformer, but with the windings omitted. In this figure, the core strips have been bent into a roughly triangular form, with some interleaving effect illustrated for the ends of the strips, and with the interleaved or overlapping portions of the strips held tightly by clips 165 to reduce any air gap effect. Figure 9A illustrates the suitably slender sectional area of this type of core, which may, for example, be, say, 0.06 square inch. This slender core permits the use of a large number of primary turns to be employed for a given design voltage of the primary winding, and the large number of turns has the benefit of offsetting to some degree any air gap effect or the damaging of the permeability qualities of the metal as occasioned by bending. In this form of transformer the lamination strips should be suitably thin to reduce damage of the qualities.

Figure 10 indicates a finished transformer 160 as constructed on the basis of core 164 of Figure 9. In this figure, the ends of the core strips are shown as merely overlapped without any interleaving, and clips 165 are omitted although some tight clamping means necessarily will be provided to reduce air gap effect as far as possible. The windings are disposed on the two long legs of the triangular-shaped core, with a portion of the primary 162 and of the secondary 163 on each such leg. With the windings 162 and 163 spread over the available core length, there is no high reactance effect at all in this transformer. Assuming sufficient winding space length of the core 164, about 60 to 70 turns of primary winding may be provided without increasing the design voltage above approximately 1 volt as has been suggested as usually adequate for the purposes herein. When winding the primary with a single layer winding of No. 14 wire, this transformer will carry say 20 amperes without excessive heating.

Figure 11:
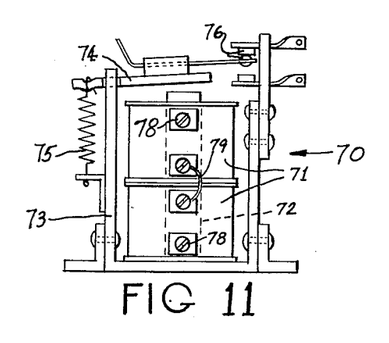

Figure 11 illustrates a typical relatively sensitive type relay 70, which may be employed as an element of the sensing system herein. The relay has two operating coils 71, a magnetic circuit comprised of core 72, frame 73, and armature 74. The armature is held at the dropped-out position by armature spring 75. Contacts 76 enable the desired control switching upon actuation of the armature. Each coil 71 is shown having two terminal screws 78, with two such terminals joined by a wire 79. Thus the two coils may be employed as a single continuous coil for use with a conventional rectifier circuit, as shown in Figure 4, or they may be employed as two alternately energized coils as in the circuit of Figure 1. Relays on the order of relay 70, when operating light duty switching contacts, are efficiently energized with say 0.1 volt-ampere of rectified current, and, in fact, the pull-in obtainable from 0.1 volt-ampere rectified current is more or less equivalent to the pull-in effect obtainable from 0.1 watt of pure D. C., such as battery current. The hold-in is not equivalent to that obtainable from pure D. C., but ordinarily, at least any current that is adequate to obtain pull-in will be adequate for the hold-in requirement.

Figure 12:
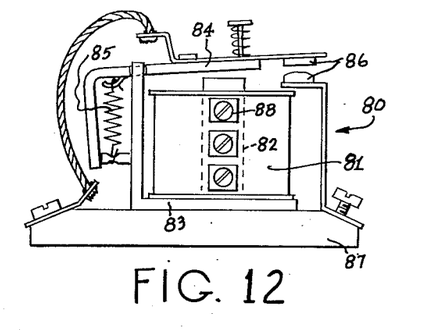
Figure 12 shows a heavier duty type of relay, such as may be used where the load current range requirement is moderate.

Figure 12 illustrates a heavier duty type of relay 80 suitable for use where larger switching capacity is required, and the operating range required is not too wide. It obviously is not desirable to operate extremely large relays directly from the output of the transformer of the present system, but relays of very fair switching ability can be operated from a very small transformer which avoids the use of an unnecessary number of relays. Relay 80 may be considered typical of relays which require from, say 1 to 2 volt-amperes of rectified current for proper operation, and the ordinary commercial relay of this type usually will have a working range when energized with rectified current, of up to 3 to 1 as a maximum and which may be suitably extended by the use of the system described herein.

Relay 80 has an operating coil 81, and a magnetic circuit comprising core 82, frame 83 and armature 84. The relay includes the armature spring 85, switching contacts 86, and an insulating base 87. Coil 81 is shown having three terminal screws 88, one of which may be a center-tap terminal so as to enable employment of the circuit of Figure 1. Therefore, coil 81 may be considered as either one large coil or as two smaller coils according to the rectification circuit that is employed.

Figure 13:
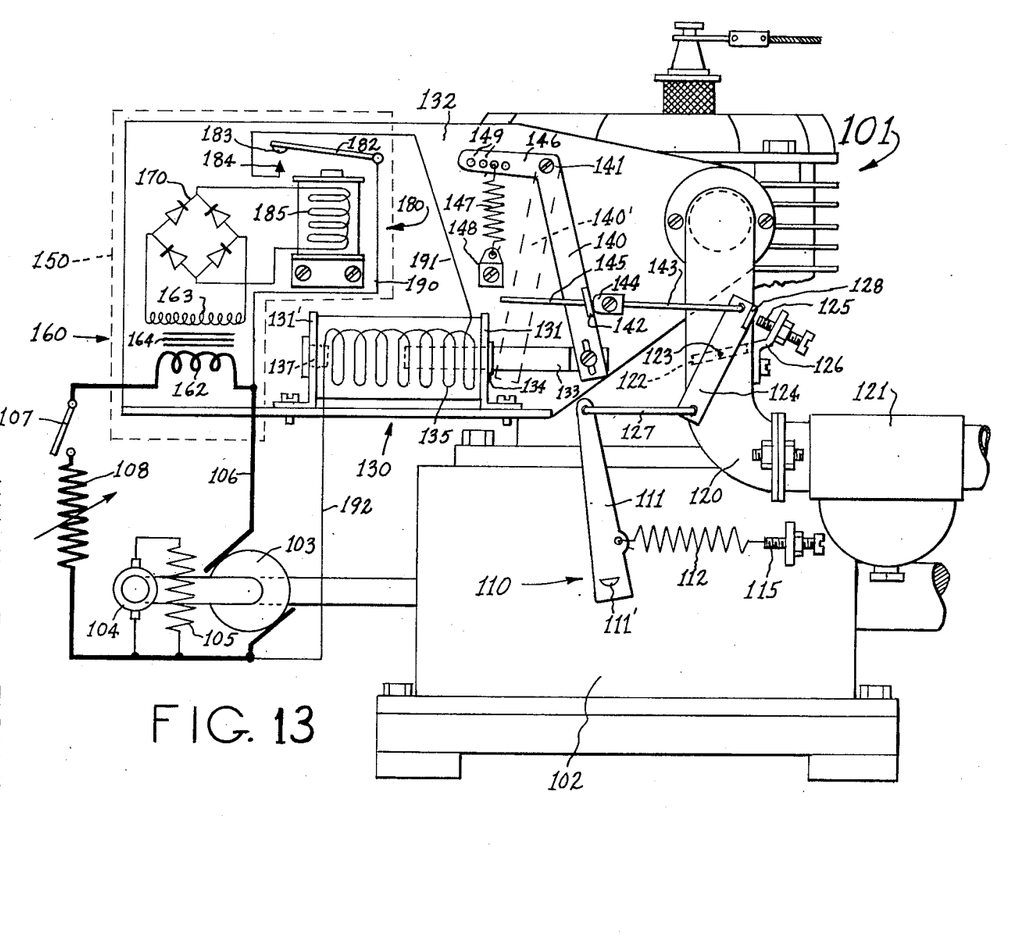

Figure 13 illustrates the current-actuated relay system (sensing system), of the present invention as an element of an idling device for an A. C. engine-generator set, as particularly suited for use with portable generator sets often used by contractors and others for operation of portable tools, such as saws and drills.

In Figure 13, numeral 101 indicates the internal combustion engine generally, usually a gasoline engine having a crankcase 102. Driven by the engine, is the A. C. load generator (or armature) 103, and the exciter generator (or armature) 104 which energizes a field 105 which, as is common in small plants, may be common to both armatures 103 and 104. Armatures 103 and 104 hereafter will be referred to as "generators." A load circuit 106 is shown and includes load switch 107 and load 108. Switch 107 and load 108 are to be considered representative of all of the lamps or motors which the engine-generator set is to serve and, in practice, there usually are several different load appliances of varying size, each having its own switch.

A mechanical governor is indicated generally as 110, and has the usual governor arm 111, loading spring 112, and loading spring adjustment screw 115. The centrifugal mechanism, which urges arm 111 leftwardly (via rocker shaft 111') with force proportionate to engine speed, is not shown, and, in small engines, is frequently located within crankcase 102.

Engine 101 has a fuel intake pipe 120 and carburetor 121. A conventional throttle 122 is disposed within intake 120, and is pivoted at 123, and has a throttle arm or lever 124 fixed thereto. A link 127 connects governor arm 111 to throttle arm 124. Throttle arm 124 has a flange 128, and an adjustment screw 125 can be adjusted to bear against flange 128 at any adjusted degree of throttle closer to prevent entire closure of the throttle. A bracket 126 supports adjustment screw 125.

The engine and fuel intake system, as thus far described, are conventional, and the effect of governor 110, considering its centrifugal mechanism and loading spring 112, would be to operate the engine at a substantially constant, high operating speed at all times. The idling device, now to be described, insures a desirably slow operating speed during such period when the load switch 107 is open.

The idling device includes an electromagnetic actuator indicated generally as 130, mounted upon an iron angle-shaped panel or bracket 132 which, in turn, is mounted upon the engine as by being clamped between 120 and the engine proper, as shown. Electromagnet 130 has iron end frames or brackets 131 and 131' which, together with panel 132, serve as elements of the magnetic circuit of the electromagnet. A plunger 133 is slidably disposed in the usual tube 134 made of brass or similar non-magnetic material, which extends through the electromagnet, and which supports operating winding 135. A fixed core or stop 137 limits the inward travel of plunger 133 and serves to close the magnetic circuit when the plunger is fully inward of winding 135. Plunger 133 is swivelly connected to and operates lever 140 which is pivoted for swing movement at 141. Lever 140 has a flange 142, having an opening therein for slidably supporting the free end 145 of a rigid link 143 which connects lever 140 with throttle arm 124 in a manner permitting lever 140 to transmit thrust to lever 124 in throttle-closing direction, by bearing against a collar 144 affixed to link 143. Lever 140 has a leftwardly extending portion 146. A tension spring 147 has one end attached to a bracket 148, and its other end connected to portion 146 by means of one of adjustment holes 149. Aside from the effect of the energization of the operating winding 135, the effect of spring 147 is to apply continuously a predetermined force on the governed fuel intake system to oppose directly the force of governor loading spring 112. If the force of spring 147 is sufficient, as by connecting the spring to that hole 149 which is farthest from the pivot point 141, the effect of spring 147 may be such as entirely to cancel or overcome the force of loading spring 112, in which case throttle arm stop screw 125 should be adjusted to preserve a sufficient minimum idling speed of the engine. Ordinarily, however, the force of spring 147 may be merely such as to cancel partially the effect of loading spring 112, in which case the engine will operate at a slow but governed idling speed without benefit of advancing the stop screw 125, and the stop screw may be adjusted merely to stabilize the operation by preventing complete closure of throttle 122.

It will be clear that if lever 140 is held at the position indicated by the broken lines 140', as by sufficient energization of operating winding 135, the effect of spring 147 will be withdrawn from the fuel intake system, and free end 145 of link 143 will slide, as necessary, through flange 142, and governor 110 will be in normal control of the intake system to maintain the higher operating speed.

The energization of operating winding 135 of the electromagnetic actuator 130 is controlled by a current-actuated relay system, or sensing system, of the same general nature as has been described heretofore in this specification. This system comprises the small transformer indicated by numeral 160, a rectifier indicated by 170, and a conventional electromagnetic switching relay indicated by 180. Since these elements may be appropriately termed a "sensing system" and function as a unit, they are enclosed by broken lines and the unit is indicated generally by the numeral 150.

As has been explained, the current output from secondary winding 163 remains relatively level regardless of variation of input to primary winding 162. The core of the transformer is indicated as 164. Current from winding 163 is rectified by rectifier 170 and the resultant unfiltered, pulsating D. C. is applied to operating winding 185 of the switching relay. Thus, when there is current flow through primary winding 162, as by closing load switch 107, winding 185 is energized and relay armature 182 is pulled down to close the movable switching contact 183 with the fixed contact 184. The closed contacts complete the energization circuit for the actuator winding 135. Selection is made of A. C. (rather than exciter current) for energization of winding 135, as this provides certain advantages. The energization circuit for winding 135 includes wires 190, 191, and 192.

The positions of the elements shown in Figure 13 are those of engine idling without load. The force of spring 147 is effectively applied against the force of governor loading spring 112, so that the engine is being operated under governor control, but on a slow speed basis. Voltage produced by generator 103 may, at a slow idling speed, be less than half of the voltage produced by full speed operation, and likewise, frequency may be considerably less than half of normal operating frequency. When appliance switch 107 is closed, there will be a current flow in the load circuit. Transformer 160 thus is energized, in turn, to energize operating winding 185 and to close relay switching contacts 183 and 184. The operating winding 135 of the actuator now is energized, but only to a relatively small degree, since generated voltage at this point is low. However, even light energization of winding 135 will serve to begin increasing engine speed, since any pull exerted by plunger 133 will serve to lessen the force exerted by throttle closing spring 147. Actuator 130 therefore is not required to be large or forceful in order to initiate the first stage of engine acceleration. As the engine accelerates, the energization of winding 135 becomes stronger, and it soon moves plunger 133 fully leftwardly to make contact with fixed stop 137, at which time lever 140 is at the broken line position 140', and spring 147 has no further throttle closing or speed-reducing effect. Loading spring 112, now unopposed, will hold throttle 122 at full open position until such time as full operating speed is reached, at which time the centrifugal governor mechanism (not shown) will be of sufficient force and effect to reduce the throttle opening to the requirement of the particular load. Full speed operation will remain in effect continuously so long as load circuit current flow continues to maintain transformer 160 in energized condition. When load switch 107 is opened, relay contacts 183 and 184 will open, and throttle closing spring 147 again is effective to apply its pressure in opposition to loading spring 112 and thus adjust the governed speed to the slow speed basis.

In addition to the employment of the particular sensing system 150, Figure 13 discloses several advantageous features. One of these is the particular manner in which the actuator and its co-acting elements are arranged to influence the governed intake system. The arrangement is in the nature of a two speed governor, which, broadly, is not new in the art, in that electromagnetic actuators have been employed to adjust the effective spring loading of a mechanical governor in a manner where the spring loading is lessened during the period when there is no electrical load on the generator. However, the specific method employed in Figure 13 for adjusting the effective spring loading of the mechanical governor is desirably simple and, in addition, is especially suited to the inherently weak motive ability of an actuator which is usually necesarily energized by generated current. The idling speed can be selected, as desired, by adjustment of the force of the spring 147, without affecting in any way the adjusted operating speed under the condition of load being connected.

It is particularly advantageous in the structure of Figure 13 that the actuator winding 135 is energized with current from the A. C. load generator 103. A relatively coarse winding may be employed to obtain significant energization, even when generated voltage drops to a very low value. The generated voltage initially will drop particularly low when the size of the initially-connected load 108 is a large one, such as a large motor, since the strength of field 105 is inherently weak under the slow speed condition, and the field strength is further weakened immediately by the effect of current flowing through the load circuit. Even though the wire size for winding 135 is relatively coarse, there will be no overheating of the winding because, once the engine has reached full operating speed, current of normal frequency will be in effect, which increases sufficiently the inductive reactance effect of electromagnet 130 so that only a few watts of power are drawn during the period of energization.

Figure 14:
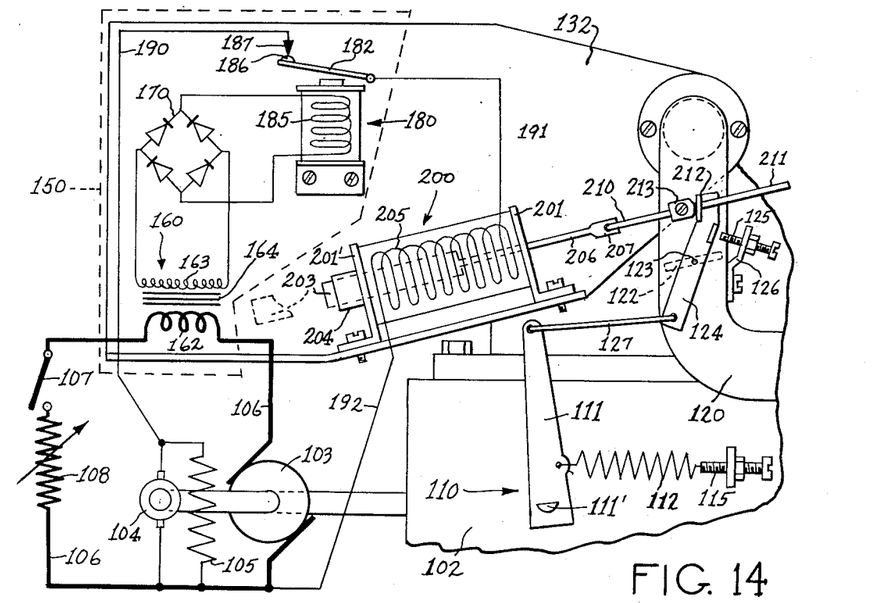
Figure 14 illustrates a similar sensing system employed to maintain an actuator energized during the off-load period.

In Figure 14, the engine and the governed fuel intake system are shown to be the same as in Figure 13. The sensing system 150 is the same except that switching contacts, 186 and 187, are of the normally-closed type, and the relay will pull in to open these contacts when the load circuit current flow is initiated by closing of load switch 107. The electromagnetic actuator of Figure 14 is designated generally by numeral 200, and is illustrated as a simple solenoid and plunger without a return magnetic circuit, since an iron frame type of electromagnet is not a strict requirement for this particular arrangement. End brackets 201 and 201' therefore may be of non-magnetic material such as brass. Plunger 203 is slidably disposed within non-magnetic tube 204. Operating winding 205 is shunt-energized by current from exciter generator 104 at such times as switching contacts 186 and 187 are closed, the circuit includes wires 190, 191 and 192.

Non-magnetic push rod 206 is affixed to the right hand end of plunger 203 and extends through an opening in end bracket 201, terminating in a flat end 207 in which is swivelly connected a rigid link 210. Link 210 has a free end 211 which is slidably supported in a flange 212 located on throttle arm 124, and a collar 213 is fixed to link 210 in a manner permitting the force of plunger 203 to be exerted on throttle arm 124 in a direction to oppose the force of governor loading spring 112.

The operating positions of the elements in effect in Figure 14 represent the condition when load switch 107 is open. Switching contacts 187 and 186 are closed, and operating winding 205 is energized to the extent of the voltage produced by exciter generator 104. Winding 205 may be of relatively coarse wire, so as to produce a reasonably strong plunger pull from the voltage produced at low speed operation. The effect of the energized actuator 200 is to act as a slow (idling) speed governor of the engine, co-acting with the loading spring 112 of the mechanical governor. The resulting effect of the control is a steady, predetermined idling speed, even immediately after cranking a cold engine, and likewise, voltage generated by generators 103 and 104 remains steady during the idling period. If the engine speed should fall off a little, with resultant decline in generated voltage, the energization of winding 205 is weakened, with a weakening of the force exerted on the intake system by plunger 203, which permits spring 112 to advance throttle 122 somewhat to restore the steady idling speed. Likewise, idling speed cannot increase appreciably, as the force of plunger 203 then becomes greater, tending to close the throttle.

It will be evident that the centrifugal mechanism (not shown) of the engine remains somewhat effective during the idling speed operation. Under the conditions of an enforced very slow idling speed, however, the effect of the centrifugal mechanism is very weak, and the principal governing influence is that of the electro-magnetic actuator. The quality of governing thus obtained is sensitive and stable, and the effective idling speed can be adjusted to some degree by adjusting the position of collar 213 on link 210 so as to position the plunger 203 in such a fraction of its travel that it will be exerting maximum pull or less than maximum pull, as desired, when throttle 122 is in the range of the relatively closed position for idling speed. It will be observed that the actuator arrangement of Figure 14 is extremely simple, does not require modifications of the main governor or intake system, and yet serves not only the primary function of overcoming the centrifugal governor for obtaining the enforced idling condition, but serves also in a governing capacity to insure steady idling speed as well as the generation of the suitable minimum voltage. Winding 205 may be energized by A. C., rather than exciter current, but in Figure 14 there is no problem of overheating the operating winding, as in Figure 13, and the use of exciter current avoids the slow frequency oscillation of plunger 203 which tends to occur if A. C. is used for energization.

At such time as the load switch 107 is closed, the resultant load circuit current flow effects the energization of the relay operating winding 185, so that armature 182 is pulled down to open contacts 186 and 187. This de-energizes winding 205 and terminates the pull by plunger 203, so that spring 112 immediately will open throttle 122 full wide, the right end of plunger 203 being moved to the broken line position where it will remain due to gravity effect. Mechanical governor 110 will assume normal control of the throttle as the engine speed increases, with flange 212 sliding freely over free end 211 of link 210. At such time as the load switch 107 is again opened, contacts 186 and 187 necessarily will close. At this instant, operation is still at the high speed basis. Thus, winding 205 momentarily will be highly energized. This effects immediate and forcible closure of throttle 122 to such limit as is determined by the adjustment of stop screw 125, but, as deceleration progresses, the slow speed governed condition of the engine will become effective.

It will be apparent to those skilled in the art that the practical value of the structures as illustrated by Figures 13 and 14 is dependent upon the ability (or sensitivity) of the load-responsive relay 180 to actuate its switching contacts when the connected load 108 is other than a large sized appliance. Considering that the output of a transformer is abnormally low when frequency is abnormally low as at low idling speeds, it may not appear feasible to obtain a sensitive A. C. idling device through the use of a current transformer to operate a conventional D. C. switching relay. However, it has been found possible to obtain an extreme range of sensitivity.

In the description of the current-actuated relay system as heretofore given in this specification with reference to Figures 1 to 4, the condition of a constant 60 cycle frequency was assumed, and the impedance match between the transformer secondary winding and the operating coil or coils of the relay could be made on the basis of 60 cycle operation.

It will be apparent that the design conditions of the sensing system, as applied for use in an idling device, are more critical than for other applications, due to the need for obtaining the initial response at a time when frequency is lower than normal. Thus, running frequency may be 60 cycles, but idling frequency may be 30 cycles or less, according to the design and adjustment of the actuator which controls the engine during the idling period. In the case of the idling device application, the predetermined small flow of load circuit current will be considered to be the small flow which occurs when the smallest lamp or motor is first switched on as load, and this flow may be especially small because generated voltage will be low and the lamp or motor load will not draw much current initially.

Fortunately, relay 180 (Figs. 13–14) can be energized with a lesser fraction of a volt-ampere of rectified current when frequency is below normal, due to the fact that the power factor is especially good at lowered frequencies, and also to the fact that relay armature 182 tends to come down just as the current flowing through coil 185 reaches its peak. However, the above does not nearly compensate for the adverse condition of having to obtain pull-in of the relay at the low frequency. Yet, heating effects in the relay energization circuit are based on the full normal frequency. Due to the variation in frequency encountered in idling device applications, it is not possible to obtain as good rectifier efficiency (at the low frequency condition), as would be obtained where such frequency variations are not present. When the engine accelerates from idling speed to running speed, there is a considerable increase in current flow in the secondary circuit of the transformer due to rise of voltage in the circuit as frequency increases, and due also to a significant improvement in rectifier efficiency. It is, however, necessary that relay coil 185 be worked to less than heat dissipation capacity at that point of operation where frequency is normal and where load circuit current flow is just sufficient to work transformer core 11 at about the saturation level, so that current flow in the secondary circuit will level off prior to overheating of coil 185, when current flow in the load circuit increases toward maximum.

The adverse conditions of the idling device application are overcome by using a relay 180 which has a considerable operating range of its own, such as a range of 5 or 6 to 1, based on energization of the relay from unsmoothed rectified current. With such a relay, the impedance match should be made in a manner that relay 180 is only lightly energized at the low frequency condition, but it must be a relay of proper type to give good positive contact operation through benefit of the light energization. While it is not practical to obtain as good rectifier efficiency as in applications where the frequency is constant, the efficiency still can be good enough to enable very sensitive response of the system.

It will be apparent that it will become very difficult to obtain response of the sensing system if the idling speed is selected too low, or if the idling speed happened momentarily to drop below that intended. The sensing system herein is quite sensitive as to frequency. Thus, a system may be designed which will give very sensitive response at 30 cycle frequency and it may be found that the same system will give no response at all at, say, 20 cycle frequency, i. e., it would not respond even to occurrence of a large initial flow of current in the load circuit. Due to this condition, it is important that engine speed be not permitted to drop below the proper frequency for obtaining response, and, in both Figures 13 and 14, the engine throttle is sufficiently governed so that there will be a relatively close frequency regulation during the idling period, to assure response on the sensing system.

This application is a continuation-in-part of copending applications Serial No. 533,128, filed on September 8, 1955; Serial No. 556,277, filed on December 29, 1955; and Serial No. 589,467, filed on June 5, 1956, by William E. McFarland.

I claim:

1. A current-actuated sensing system responsive at least to a predetermined small current flow in a load circuit subject to a range including small and large current flow due to varying loads, comprising a current transformer having a saturable core, a primary winding mounted thereon and designed for connection into said load circuit, secondary winding means wound on said core, an electromagnetic actuating relay having operating coil means, said sensing system also having rectifier means, and circuit joining means for joining said secondary winding means with said rectifier means and with said coil means for the energization of said relay by rectified current from said transformer, said transformer being constructed and designed for operation of its core at about the saturation level even from the effect of small load circuit current flow while adequately energizing said relay through benefit of said rectifier means, said relay and relay coil means being designed and impedance matched to said secondary winding means for effecting operative energization of said relay even at said predetermined small load circuit current flow and being matched within such limits whereby said relay including said coil means is not worked to capacity at the point of still small load circuit flow when the transformer core is being operated only to saturation, thereby enabling leveling off of the energization of said relay on occurrence of larger circuit flow, the design voltage of said secondary winding means being a sufficiently high voltage to permit good functioning of said rectifier means by that value of small load current necessary for operating said core just about to saturation, said design voltage being a sufficiently low voltage whereby large rectifier leakage currents occur only when said transformer core is operated beyond saturation by effect of large load circuit current flow.

2. A current-actuated sensing system responsive at least to a predetermined small current flow in a load circuit subject to a range including small and large current flow due to varying loads, comprising a current transformer having a saturable core, a primary winding mounted thereon and designed for connection into said load circuit, secondary winding means wound on said core, an electromagnetic actuating relay having operating coil means, said sensing system also having rectifier means, and circuit joining means for joining said secondary winding means with said rectifier means and with said coil means for the energization of said relay by rectified current from said transformer, said transformer core having permeability qualities enabling operation of the core at about saturation at a condition of even a small load circuit current flow and even while at the same time drawing an output from said transformer adequate at least for the operative energization of said relay, while energizing said relay through benefit of the hereinaftermentioned good rectifier efficiency, said relay and relay coil means being designed and impedance-matched to said secondary winding means in a manner to effect operative energization of said relay at least at occurrence of said predetermined small load circuit current flow, said impedance match being made within limits such that said relay is energized to less than the working capacity of said relay coil means at that point of still small load circuit current flow when said transformer core is operating only to saturation and whereby said relay coil means will not be energized to more than its dissipation capacity when said transformer core is operated beyond saturation through effect of large load circuit current flow, said secondary winding means being designed for a voltage output within such limits whereby good rectifier efficiency is effected at least by the time said transformer core is operated just to saturation and also within such limits whereby the occurrence of significantly large rectifier leakage current is deferred until larger load circuit current flows so that said transformer core is operated beyond saturation, whereby the effect of said leakage current in heating any of the elements of the electromagnetic relay circuit is held within the limits of dissipation capacity of said elements.

3. A current-actuated sensing system according to claim 2 in which the transformer is a small transformer the design voltage of the primary winding of which is of the order of only one volt, and the secondary winding of which is designed for small capacity limiting the permissible output of the transformer in watts to a fraction of the maximum input of the transformer in volt-amperes, and the electromagnetic relay of which is a small switching relay, and wherein said relay and said coil means are impedance-matched within limits such that the relay is energized to less than working capacity of the relay coil means and to less than saturation of the magnetic core of said relay at that point of still small circuit current flow when said transformer core is operating only to saturation whereby said coil means will present a reactance adequate to limit current flow through said coil means within the dissipation capacity thereof when said transformer core is operated beyond saturation through effect of large circuit current flow.

4. A current-actuated sensing system according to claim 3 in which the small circuit current flow is identical with the predetermined small flow.

5. A current-actuated sensing system responsive at least to a predetermined small current flow in a load circuit subject to a range including small and large current flow due to varying loads, comprising a current transformer having a saturable core, a primary winding mounted thereon and designed for connection into said load circuit, secondary winding means wound on said core, an electromagnetic switching relay having two operating coils, said sensing system also having rectifier means comprising two rectifiers, one for each operating coil, and circuit joining means for joining said secondary winding means with said two rectifiers and with said two operating coils in a manner whereby said two coils are energized on alternate half-cycles by rectified current from said transformer to provide the energization of said relay, said transformer core having permeability qualities enabling operation of the core at about saturation at a condition of even a small load circuit current flow and even while at the same time drawing an output from said transformer adequate at least for the operative energization of said relay, while energizing said relay through benefit of the hereinafter-mentioned good rectifier efficiency, said relay including said two operating coils being designed and impedance-matched to said secondary winding means in a manner to effect operative energization of said relay at least at occurrence of said predetermined small load circuit current flow, said impedance match being made within limits such that said relay is energized to less than the working capacity of said two relay coils at that point of still small load circuit current flow when said transformer core is operating only to saturation and whereby said two relay coils will not be energized to more than their dissipation capacity when said transformer core is operated beyond saturation through effect of large load circuit current flow, said secondary winding means being designed for a voltage output within such limits whereby good rectifier efficiency is effective at least by the time said transformer core is operated just to saturation and within such limits whereby the occurrence of significantly large rectifier leakage current is deferred until larger load circuit current flows so that said transformer core is operated beyond saturation, whereby the effect of said leakage current in heating any of the elements of the electromagnetic relay circuit is held within the limits of dissipation capacity of said elements.

6. A current-actuated sensing system according to claim 5 in which the switching relay has only one magnetic circuit and in which the two alternately energized relay operating coils are constructed to act on said one magnetic circuit in a manner so as to provide a continuous unipolar energization of said magnetic circuit whereby when rectifier leakage current is flowing through one of said two rectifiers and also through one of said two coils, the effect of said leakage current will be to lower the effective reactance of the other of said coils to permit an increase in flow of energizing current through the other coil and in a forward direction through the other of said two rectifiers so that the relay remains operatively energized in spite of the de-energizing effect of leakage current flowing through one coil.

7. A current-actuated sensing system according to claim 6 in which said switching relay has a magnetic circuit incorporating more than one leg, and in which the said two alternately energized relay operating coils are disposed upon the same leg of said magnetic circuit.

8. A current-actuated sensing system according to claim 7 in which said two alternately-energized relay operating coils are arranged concentrically whereby neither coil is positioned appreciably closer to the air gap between the core and the armature of said magnetic circuit.

9. In an idling device for an A. C. engine-generator set supplying small and large current flow through a load circuit, to a load, said set having a governed fuel intake system for maintaining a predetermined load speed operation of the engine under varying load conditions, said idling device having an electromagnetic actuator acting on the intake system to enable engine operation at forced idling speed thereby lowering the generated frequency at one condition of energization of said actuator, and a source of energization current connectable to said actuator, the improvement comprising a current-actuated sensing system responsive at least to the initiation of a predetermined small flow of low frequency load current and to the termination of normal frequency current flowing through the load circuit, said sensing system comprising a current transformer having a saturable core, a primary winding mounted thereon and designed for connection in series with said load circuit, secondary winding means wound on said core, an electromagnetic switching relay having switching contacts for controlling said actuator and having operating coil means, said sensing system also having rectifier means, and circuit joining means for joining said secondary winding with said rectifier means and with said coil means for the energization of said relay by rectified current from said transformer, said transformer having permeability qualities enabling operation of the core at about saturation at a condition of even a small load circuit current flow of low frequency and even while at the same time drawing an output from said transformer adequate at least for the operative energization of said relay while energizing said relay through benefit of the hereinafter-mentioned good rectifier efficiency, said relay and relay coil means being designed and impedance-matched to said secondary winding means in a manner to effect operative energization of said relay at least at occurrence of said predetermined small load circuit current flow, said impedance match being made within limits such that said relay is energized to less than the working capacity of said relay coil means at that point of still small load circuit current flow when said transformer core is operating only to saturation but at normal frequency and whereby said relay coil means will not be energized to more than its dissipation capacity when said transformer core is operated beyond saturation through effect of large load circuit current flow, said secondary winding means being designed for a voltage output within such limits whereby good rectifier efficiency is effected at least by the time said transformer core is operated just to saturation and also within such limits whereby the occurrence of significantly large rectifier leakage current is deferred until larger load circuit current flows so that said transformer core is operated beyond saturation, whereby the effect of said leakage current in heating any of the elements of the electromagnetic relay circuit is held within the limits of dissipation capacity of said elements, said relay having switching contacts arranged to control the energization of said actuator in a manner to effect said one condition of energization at termination of load circuit current flow.

10. An idling device according to claim 9 in which said electromagnetic actuator is constructed and arranged to act on said intake system in a manner to enable engine operation at forced idling speed when said actuator is energized, and in which said source of energization is current generated by said engine-generator set, and in which said switching relay has normally-closed contacts arranged to effect the energization of said actuator at the termination of current flowing through the load circuit, and the de-energization of said actuator at the initiation of a predetermined small flow of load current.

11. An idling device according to claim 9 in which said electromagnetic actuator is constructed and arranged to act on said intake system in a manner to enable engine operation at forced idling speed when said actuator is de-energized, and is which said source of energization is current generated by said engine-generator set, and in which said switching relay has normally-open contacts arranged to effect the de-energization of said actuator at the termination of normal current flowing through the load circuit, and the energization of said actuator at the initiation of a predetermined small flow of load current.

12. A current-actuated sensing system according to claim 2 in which the transformer core is one made of thin layers of grain-oriented material having a rectangular hysteresis loop.

13. A current-actuated sensing system according to claim 12 in which said core is a tape-wound core.

References Cited in the file of this patent
UNITED STATES PATENTS

| | | |
|---|---|---|
| 714,891 | Gill | Dec. 2, 1902 |
| 1,204,507 | Smith et al. | Nov. 14, 1916 |
| 1,698,289 | Wood | Dec. 25, 1928 |
| 1,940,335 | Suits | Dec. 19, 1933 |
| 2,242,072 | Holslag | May 13, 1941 |
| 2,313,306 | Wiegand | Mar. 9, 1943 |
| 2,396,176 | Hobart | Mar. 5, 1946 |
| 2,488,171 | Campbell | Nov. 15, 1949 |
| 2,503,483 | Hartman | Apr. 11, 1950 |
| 2,649,557 | Ransom | Aug. 18, 1953 |

OTHER REFERENCES

"Carpenter High Permeability Alloys," by Magnetic Metals Company, Engineers Catalog No. 1015, by Federal Telephone and Radio Corporation, Clifton, New Jersey.